(12) United States Patent
Deschenes et al.

(10) Patent No.: US 6,302,157 B1
(45) Date of Patent: Oct. 16, 2001

(54) CABLE TIE INSTALLATION TOOL

(75) Inventors: Charles L. Deschenes, North Attleboro; John R. Franks, Hopkinton; Paul A. Davignon, Uxbridge, all of MA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/569,809

(22) Filed: May 12, 2000

Related U.S. Application Data

(60) Provisional application No. 60/134,149, filed on May 14, 1999, provisional application No. 60/143,863, filed on Jul. 15, 1999, and provisional application No. 60/144,504, filed on Jul. 19, 1999.

(51) Int. Cl.[7] ........................................... B21F 9/02
(52) U.S. Cl. ........................................ 140/123.6; 140/93.2
(58) Field of Search ................................. 140/93 A, 93.2, 140/123.6

(56) References Cited

U.S. PATENT DOCUMENTS

| | | |
|---|---|---|
| 3,670,782 | 6/1972 | Kabel . |
| 3,694,863 | 10/1972 | Wasserlein, Jr. . |
| 3,766,608 | 10/1973 | Fay . |
| 4,287,644 | 9/1981 | Durand . |
| 4,347,648 | 9/1982 | Dekkers . |
| 4,371,010 * | 2/1983 | Hidassy ............................. 140/93 A |
| 4,754,529 | 7/1988 | Paradis . |
| 4,788,751 | 12/1988 | Shely et al. . |
| 5,102,075 | 4/1992 | Dyer . |
| 5,205,328 | 4/1993 | Johnson et al. . |
| 5,544,391 | 8/1996 | Hoffman . |
| 5,595,220 | 1/1997 | Leban et al. . |
| 5,669,111 | 9/1997 | Rohaly . |
| 5,803,413 | 9/1998 | Benoit et al. . |
| 5,836,053 | 11/1998 | Davignon et al. . |
| 5,944,063 * | 8/1999 | Kurmis ............................... 140/93 A |

FOREIGN PATENT DOCUMENTS 2040352A 8/1980 (GB) .

* cited by examiner

*Primary Examiner*—Lowell A. Larson
(74) *Attorney, Agent, or Firm*—Kriegsman & Kriegsman

(57) ABSTRACT

A cable tie is used in conjunction with a cable tie installation tool to bundle a plurality of objects, such as wires or cables. The cable tie includes a head and a tail, the head having a pair of outwardly projecting wings. The tail is capable of insertion through the head so that the cable tie takes the shape of a loop with the tail engaging and being locked in position by a pawl inside the head, the tail being incapable of removal once it is inserted in the head. The cable tie installation tool includes a housing which is adapted to receive an individually loaded cable tie and which protects internal components of the tool. A transport assembly, which includes a motor driven belt, advances the tail of the cable tie around the plurality of objects to be bundled. A jaw assembly, which includes an upper jaw and a lower jaw that are driven by a motor into open, closed and overdosed positions, guides the tail through the head to form the cable tie into a closed loop around the desired bundle. A cinch assembly, which includes a pair of spaced apart, motor driven cinch knurls, further advances the tail through the head so as to reduce the size of the closed loop around the desired bundle. A tension monitoring device establishes and monitors a maximum tension level for the closed loop around the bundle, the device terminating activation of the cinch assembly upon detecting the maximum tension level. A cut assembly, which includes a knife blade coupled to a solenoid, severs the excess portion of the tail fed through the head once the tension monitoring device terminates activation of the cinch assembly.

27 Claims, 11 Drawing Sheets

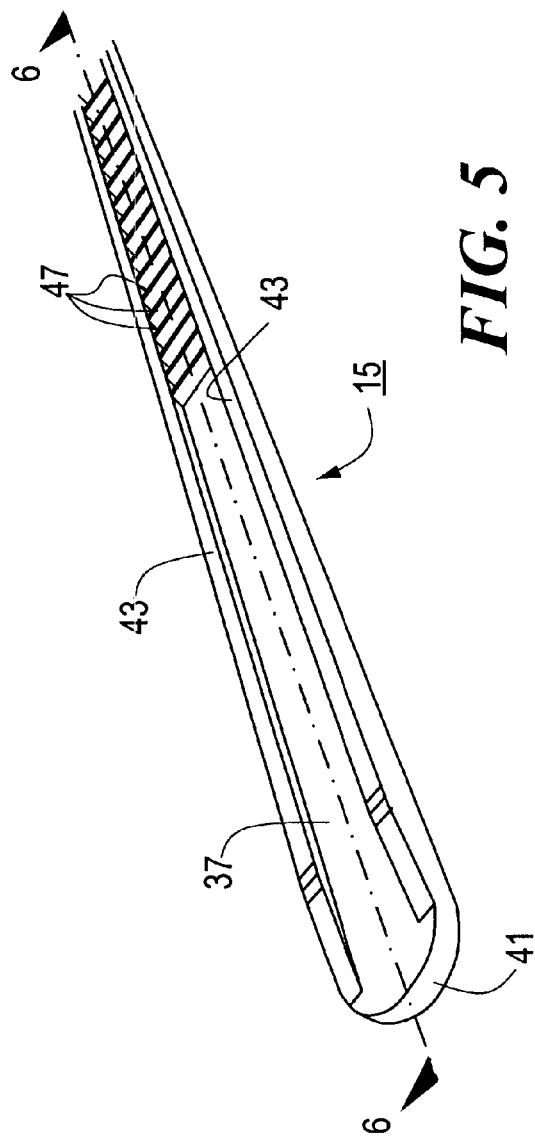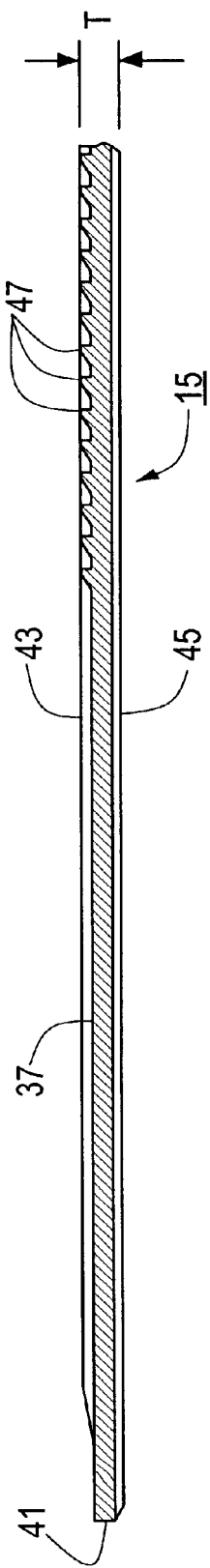
FIG. 5
FIG. 6

CABLE TIE INSTALLATION TOOL

CROSS-REFERENCE TO RELATED APPLICATIONS

This application claims the priority of provisional patent application Ser. No. 60/134,149, which was filed on May 14, 1999 in the names of Charles L. Deschenes, John R. Franks and Paul A. Davignon, provisional patent application Ser. No. 60/143,863, which was filed on Jul. 15, 1999 in the names of Charles L. Deschenes, John R. Franks and Paul A. Davignon and provisional patent application Ser. No. 60/144,504, which was filed on Jul. 19, 1999 in the names of Charles L. Deschenes and John R. Franks.

BACKGROUND OF THE INVENTION

The present invention relates generally to cable ties and more particularly to a cable tie used in conjunction with a cable tie installation tool.

Cable ties, also known as harnessing devices, are well known devices and are commonly used in the art for holding together a bundle of objects, such as wires or cables.

One type of cable tie which is well known and widely used in the art comprises an elongated strip of plastic material having rectangular head at one end and a serrated tail at the other end. Feeding the tail of the tie through a strap receiving channel formed in the head results in the cable tie taking the shape of a loop with the serrations of the tail engaging and being locked in position by a pawl inside the head, the tail being incapable of removal once it is inserted in the head.

In U.S. Pat. No. 4,754,529 to J. R. Paradis, which is incorporated herein by reference, there is disclosed a bundling of objects using a harnessing device with a locking head and a strap with teeth that are controlled by stretching. The locking head contains a pawl or tang that engages the teeth of the strap by wedging. One or more wedging teeth are desirably located on the locking tang as well. A further tooth to promote locking is desirably included in the locking head. The strap is advantageously molded of stretch reorientable material which is subsequently stretched to control the profile of the teeth which are engaged by the locking tang and head. The teeth are spaced on the strap to permit use of the teeth near the head for the harnessing of small bundles. The pawl is provided with specified pivot points for both the insertion and loading of the strap in the head.

Another type of cable tie which is well known and widely used in the art comprises an apertured strap fitted to a buckle-like head, with a tongue that enters the apertures of the strap.

In U.S. Pat. No. 3,766,608 to R. B. Fay, which is incorporated herein by reference, there is disclosed a tie formed by a locking head and an attached ladder strap. The head contains a longitudinal guide channel for receiving the strap, after encirclement of items to be bundled, and an internal locking tang. The latter is deflected with respect to relatively narrow auxiliary channels on opposite sides of the guide channel. One of the auxiliary channels receives the locking tang during the bundling of the items; the other auxiliary channel contains a stop against which the locking tang becomes abutted in planar engagement by the reverse thrust of the harnessed items.

In U.S. Pat. No. 4,347,648 to L. P. Dekkers, which is incorporated herein by reference, there is disclosed a tie formed by a locking head and an attached ladder strap. The head contains a locking tang and a guide channel that receives the strap after encirclement of items to be bundled. The tang engages the rungs of the ladder strap for the adjustable retention of the items. The free end of the strap has a light-weight webbed tail that facilitates the insertion of the strap into the head. The strap is advantageously molded of a stretch reorientable material and is subsequently stretched to produce a suitable strengthening and elongation of the webbed tail.

Cable ties of the type described above are often wrapped around a bundle of objects using a portable cable tie installation tool. As can be appreciated, cable tie installation tools facilitate the ease in which an operator can feed the tail of a cable tie through its associated head, which is highly desirable.

A fully automatic cable tie installation tool is one well known type of cable tie installation tool which is well known and widely used in the art.

Fully automatic cable tie installation tools typically comprise an electric motor that derives its power from a power cord or a battery pack which is either disposed within the tool or carried by the operator. The electric motor is used to automatically separate an individual cable tie from a clip, or strip, of interconnected cable ties and automatically wrap the individual cable tie around the desired bundle using a pair of arcuate jaws.

Fully automatic cable tie installation tools of the type described above are well known and are commonly used in commerce. However, it has been found that fully automatic cable tie installation tools suffer from a notable drawback.

Specifically, it has been found that the automatically driven mechanics which separate an individual cable tie from a clip of interconnected cable ties greatly increases the overall complexity of the tool. As a result, fully automatic cable tie installation tools are have been found to be considerably expensive to manufacture and heavy, which is highly undesirable.

SUMMARY OF THE INVENTION

It is an object of the present invention to provide a new and improved cable tie installation tool.

It is another object of the present invention to provide a new and improved cable tie installation tool which can be used to wrap a cable tie around a bundle of two or more objects.

It is yet another object of the present invention to provide a cable tie installation tool as described above which is simple and inexpensive to manufacture.

It is still another object of the present invention to provide a tie as described above which is easy to use.

It is another object of the present invention to provide a tie as described above which is lightweight and highly portable.

Accordingly, as one feature of the present invention, there is provided a cable tie installation tool for fastening a cable tie around a plurality of objects, said cable tie comprising a head and a tail integrally formed onto said head, said head being adapted to cooperate with said tail to form a closed loop around the plurality of objects, said cable tie installation tool comprising, a jaw assembly adapted to guide the tail around the plurality of objects and through its associated head to form the cable tie into a closed loop around the plurality of objects, and a transport assembly for advancing the cable tie into said jaw assembly, said transport assembly comprising a belt.

As another feature of the present invention, there is provided a cable tie installation tool comprising a cable tie installation tool for fastening a cable tie around a plurality of objects, said cable tie comprising a head and a tail integrally formed onto said head, said head being adapted to cooperate with said tail to form a closed loop around the plurality of objects, said cable tie installation tool comprising, a jaw assembly adapted to guide the tail around the plurality of objects and through its associated head to form the cable tie into a closed loop around the plurality of objects, a transport assembly for advancing the cable tie into said jaw assembly, a cinch assembly for advancing the tail through the head so as to reduce the size of the closed loop around the plurality of objects, said cinch assembly comprising first and second cinch knurls, said first and second cinch knurls being spaced slightly apart, wherein each of said first and second cinch knurls is rotatably driven by a motor, a tension monitoring device for monitoring the tension level of the closed loop around the bundle and establishing a maximum tension level, said tension monitoring device precluding said cinch assembly from advancing the tail through the head upon detecting the maximum tension level, and a cut assembly coupled to said tension monitoring device for severing the excess portion of the tail fed through the head once said tension monitoring device detects the maximum tension level.

As another feature of the present invention, there is provided a cable tie installation tool for fastening a cable tie around a plurality of objects, said cable tie comprising a head and a tail integrally formed onto said head, said head being adapted to cooperate with said tail to form a closed loop around the plurality of objects, said cable tie installation tool comprising, a jaw assembly adapted to guide the tail around the plurality of objects and through its associated head to form the cable tie into a closed loop around the plurality of objects, a transport assembly for advancing the cable tie into said jaw assembly, a cinch assembly for advancing the tail through the head so as to reduce the size of the closed loop around the plurality of objects, a tension monitoring device for monitoring the tension level of the closed loop around the bundle and establishing a maximum tension level, said tension monitoring device precluding said cinch assembly from advancing the tail through the head upon detecting the maximum tension level, said tension monitoring device being in the form of a control circuit, and a cut assembly for severing the excess portion of the tail fed through the head once said tension monitoring device detects the maximum tension level, said cut assembly comprising a solenoid which is electrically coupled to the control circuit.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings, wherein like reference numerals represent like parts:

FIG. 5 is an enlarged, fragmentary, top perspective view of the cable tie shown in FIG. 1;

FIG. 6 is a side section view of the cable tie shown in FIG. 5, taken along lines 6—6;

DETAILED DESCRIPTION OF A PREFERRED EMBODIMENT

Cable Tie

Figure 1:
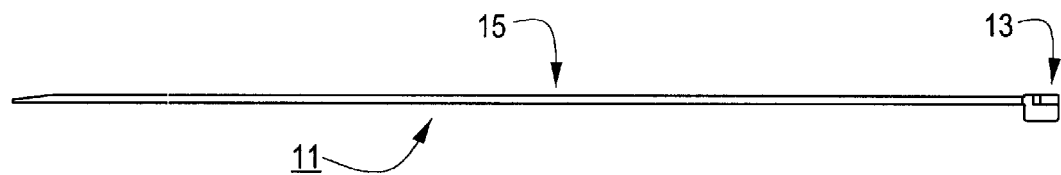
FIG. 1 is a side view of a first embodiment of a cable tie constructed according to the teachings of the present invention.

Referring now to the drawings, there is shown in FIGS. 1–6, a first embodiment of a cable tie constructed according to the teachings of the present invention, the cable tie being identified by reference numeral 11. In use, cable tie 11 can be formed into a loop to wrap a bundle of objects O$_b$, such as cables or wires.

As will be described further in detail below, cable tie 11 is designed to be used in conjunction with a preferred cable tie installation tool constructed according to the teachings of the present invention, the preferred cable tie installation tool being identified by reference numeral 12. However, it is to be understood that cable tie 11 is not limited to being wrapped around a bundle of objects using cable tie installation tool 12. Rather, cable tie 11 could be wrapped around a bundle of objects by alternative means, such by manual installation or using other well known types of cable tie installation tools, without departing from the spirit of the present invention.

Cable tie 11 is preferably constructed of a durable and flexible material, such as plastic, and comprises a head 13 and a tail 15.

Head 13 comprises a generally flat top surface 17, a generally flat bottom surface 19, a strap accepting channel 20, an inner wall 21, a first sidewall 23-1, a second sidewall 23-2, an end wall 25 and a locking pawl 26 disposed to project into strap accepting channel 20.

Strap accepting channel 20 is sized and shaped to enable tail 15 to be fed therethrough, thereby enabling cable tie 11 to be formed into a closed loop. As will be described further in detail below, locking pawl 26 is disposed to project into strap accepting channel 20 and lockably engage tail 15, thereby precluding tail 15 from being backed out of head 13. Locking pawl 26 is preferably a flexible locking pawl; however, it is to be understood that pawl 26 could be replaced with alternative types of locking devices, such as a fixed pawl, without departing from the spirit of the present invention.

Figure 2:
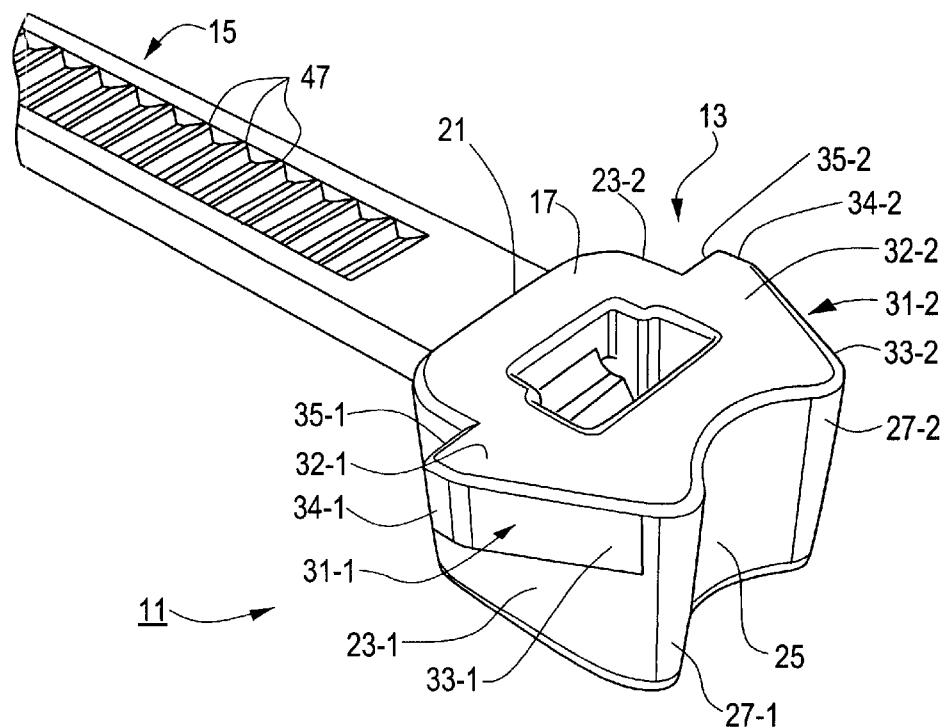
FIG. 2 is an enlarged, fragmentary, top perspective view of the cable tie shown in FIG. 1.
Figure 3:
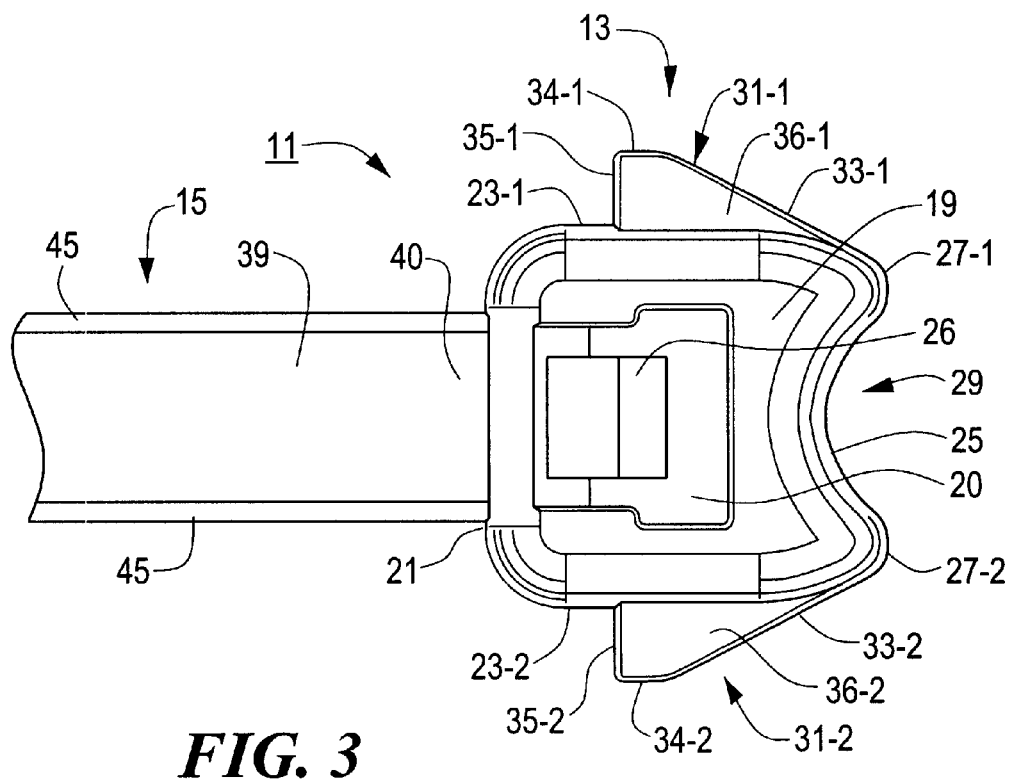
FIG. 3 is an enlarged, fragmentary, bottom view of the cable tie shown in FIG. 1.

End wall 25 is shaped to include first and second significantly curved, or rounded, corners 27-1 and 27-2 at its junction with sidewalls 23-1 and 23-2, respectively, as shown in FIGS. 2 and 3. It should be noted that curved corners 27 provide end wall 25, and consequently head 13, with a generally rounded shape. As can be appreciated, the rounded shape of head 13 is important in the use of cable tie 11 in conjunction with cable tie installation tool 12. Specifically, the rounded shape of end wall 25 enables head 13 to fit snugly within a circular opening formed in the transport belt of cable tie installation tool 12, as will be described further in detail below.

End wall 25 is inwardly curved so as to define a curved recess 29 between rounded corners 27. As can be appreciated, the inward curvature of end wall 25 serves to reduce the amount of material required to form cable tie 11, thereby decreasing the overall cost in manufacturing cable tie 11, which is an object of the present invention.

Cable tie 11 further comprises a first outwardly protruding wing 31-1 which is formed onto and extends out from first sidewall 23-1 and a second outwardly protruding wing 31-2 which is formed onto and extends out from second sidewall 23-2. First and second outwardly protruding wings 31 are preferably integrally formed onto head 13. However, it is to be understood that wings 31 could be alternatively formed onto head 13 without departing from the spirit of the present invention.

Outwardly protruding wing 31-1 includes a flat top surface 32-1. Similarly, outwardly protruding wing 31-2 which includes a flat top surface 32-2. As shown in FIG. 2, top surfaces 31-1 and 31-2 lie flush with top surface 17 of head 13.

Outwardly protruding wing 31-1 is shaped to include a first side panel 33-1, a second side panel 34-1 and third side panel 35-1, as shown in FIG. 3. First side panel 33-1 is generally flat and extends from rounded corner 27-1 at an acute angle away from sidewall 23-1, first side panel 33-1 having a length which is approximately ½ the length of head 13. Second side panel 34-1 is generally flat and extends from first side panel 33-1 at an angle such that second side panel 34-1 is disposed in parallel with sidewall 23-1. Third side panel 35-1 is generally flat and extends from second side panel 34-1 at an angle such that third side panel 35-1 projects perpendicularly into sidewall 23-1.

Similarly, outwardly protruding wing 31-2 is shaped to include a first side panel 33-2, a second side panel 34-2 and third side panel 35-2, as shown in FIG. 3. First side panel 33-2 is generally flat and extends from rounded corner 27-2 at an acute angle away from sidewall 23-2, first side panel 33-2 having a length which is approximately ½ the length of head 13. Second side panel 34-2 is generally flat and extends from first side panel 33-2 at an angle such that second side panel 34-2 is disposed in parallel with sidewall 23-2. Third side panel 35-2 is generally flat and extends from second side panel 34-2 at an angle such that third side panel 35-2 projects perpendicularly into sidewall 23-2.

It should be noted that, in this manner, each of third side panels 35 forms a flat, engagement surface which is of significance in the use of cable tie 11 in conjunction with cable tie installation tool 12. Specifically, each of third side panels 35 is sized, shaped and orientated to abut against an associated hard alignment stop formed in the housing of cable tie installation tool 12 so as to limit the forward displacement of cable tie 11 by the transportation belt of tool 12. As such, the abutment of third side panels 35 against the hard alignment stops in the housing serves to properly align head 13 of cable tie 11 within tool 12 during the cable tie bundling, or wrapping, process, as will be described further in detail below.

It should also be noted that each of outwardly protruding wings 31 is not limited to the particular arrangement of side panels 33, 34 and 35. Rather, the total number, size, shape and orientation of side panels for wings 31 could be modified without departing from the spirit of the present invention.

Figure 4:
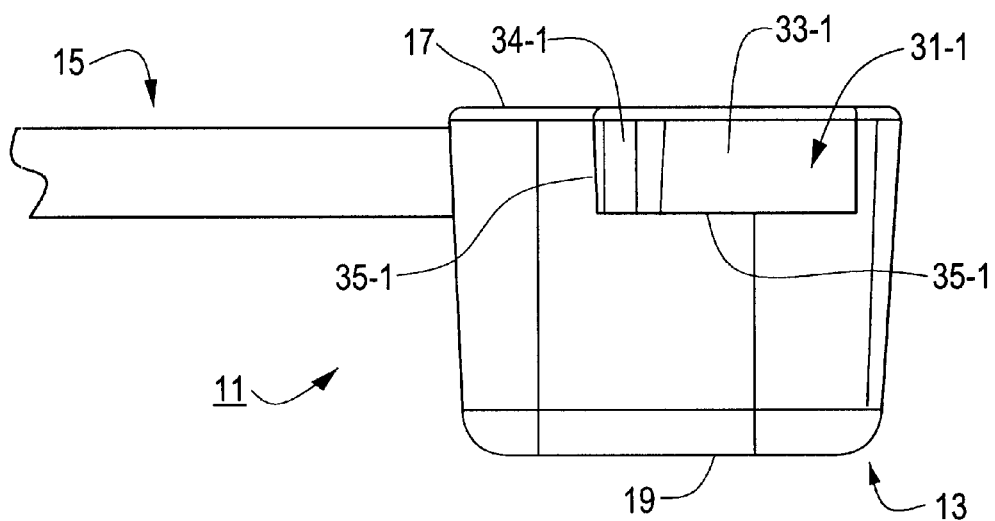
FIG. 4 is an enlarged, side view of the cable tie shown in FIG. 1.

Outwardly protruding wing 31-1 is further shaped to include a bottom surface 36-1. Bottom surface 36-1 is generally flat and extends perpendicularly out from sidewall 23-1 approximately one-quarter of the distance down from top surface 17 to bottom surface 19, as shown in FIG. 4. Similarly outwardly protruding wing 31-2 is further shaped to include a bottom surface 36-2. Bottom surface 36-2 is generally flat and extends perpendicularly out from sidewall 23-2 approximately one-quarter of the distance down from top surface 17 to bottom surface 19, as shown in FIG. 4.

It should be noted that, in this manner, each bottom surface 36 forms a support surface which is of significance in the use of cable tie 11 in conjunction with cable tie installation tool 12. Specifically, bottom surfaces 36 of outwardly protruding wings 31 are sized, shaped and orientated to lie on top of the transportation belt of cable tie installation tool 12. As such, bottom surfaces 36 of outwardly protruding wings 31 serve as a support means for preventing head 13 of cable tie 11 from falling through the circular opening provided in the transportation belt of tool 12.

Tail 15 comprises a top surface 37, a bottom surface 39, a first end 40, a free end 41, a first pair of rails 43 formed on top surface 37, a second pair of rails 45 formed on bottom surface 37 and a plurality of ratchet teeth 47 formed on top surface 37 between first pair of rails 43.

First end 40 of tail 15 is connected to inner wall 21 of head 13 to make cable tie 11 a unitary device. Preferably, first end 40 of tail 15 is integrally formed onto inner wall 21 of head 13 using conventional cable tie manufacturing techniques, such as injection molding.

First pair of rails 43 and second pair of rails 45 extend nearly the entire length of tail 15 and terminate at free end 41. First pair of rails 43 taper slightly at free end 41, but otherwise, the extension of first and second pairs of rails 43 and 45 to free end 41 provides tail 15 with a nearly uniform cross-sectional area, or thickness T, as shown in FIG. 6. Furthermore, the extension of first and second pairs of rails 43 and 45 to free end 41 serves to increase the overall thickness T of tail 15 without significantly compromising the flexibility of cable tie 11.

Plurality of ratchet teeth 47 are sized and shaped to be engaged by locking pawl 26 to prevent tail 15 from being backed out of strap accepting channel 20 of head 13 when cable tie 11 is formed into a closed loop. Although cable tie 11 is shown comprising ratchet teeth 47, it is to be understood that tail 15 could comprise alternative means for engaging pawl 26, such as a ladder construction, without departing from the spirit of the present invention.

As can be appreciated, the relatively large and nearly uniform thickness T of tail 15 provides an important advantage in the use of cable tie 11 in conjunction with cable tie installation tool 12. Specifically, the relatively large and nearly uniform thickness of tail 15 enables a pair of spaced apart, fixed, cinch knurls in tool 12 to advance tail 15 through head 13 without the cinch knurls damaging any portion of tail 15.

Figure 7:
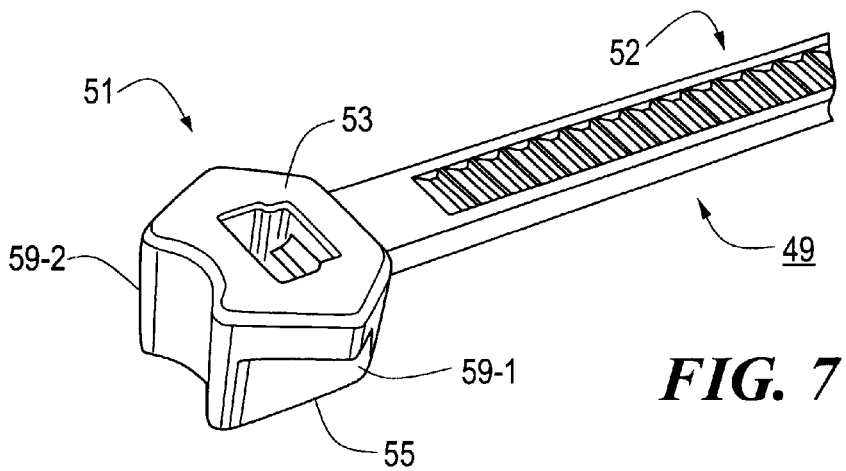
FIG. 7 is an enlarged, fragmentary, top perspective view of a second embodiment of a cable tie constructed according to the teachings of the present invention.
Figure 8:
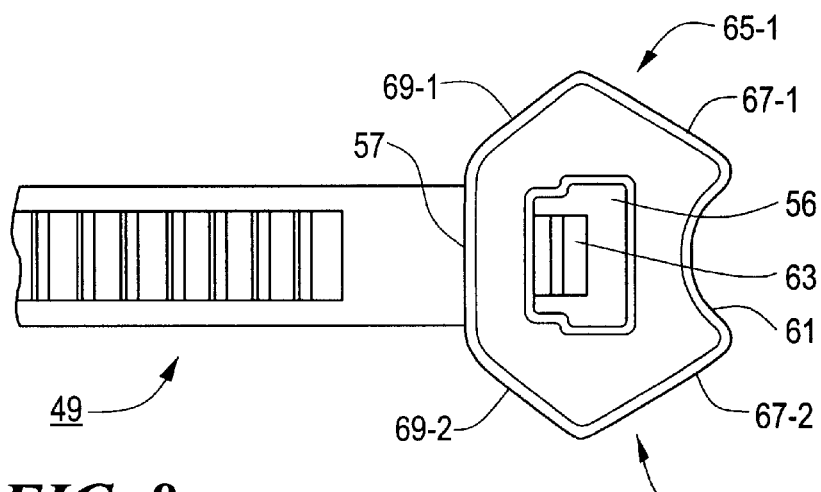
FIG. 8 is an enlarged, fragmentary, top view of the cable tie shown in FIG. 7.

As noted above, each of outwardly protruding wings 31 is not limited to the particular arrangement of side panels 33, 34 and 35. Rather, the total number, size, shape and orientation of the side panels for wings 31 could be modified without departing from the spirit of the present invention. Accordingly, FIGS. 7 and 8 show a second embodiment of a cable tie constructed according to the teachings of the present invention, the cable being identified by reference numeral 49.

Cable tie 49 comprises a head 51 and a tail 52. Head 51 comprises a generally flat top surface 53, a generally flat bottom surface 55, a strap accepting channel 56, an inner wall 57, a first sidewall 59-1, a second sidewall 59-2, an end wall 61 and a locking pawl 63.

Cable tie 49 further comprises a first outwardly protruding wing 65-1 which is formed onto and extends out from first sidewall 59-1 and a second outwardly protruding wing 65-2 which is formed onto and extends out from second sidewall 59-2.

Cable tie 49 differs from cable tie 11 only in that wings 65 have a different number, size, shape and orientation of side panels than wings 31 of cable tie 11.

Specifically, first outwardly protruding wing 65-1 is shaped to include a first side panel 67-1 and a second side panel 69-1. First side panel 67-1 is generally flat and extends from end wall 51 at an acute angle away from sidewall 59-1, first side panel 67-1 having a length which is approximately ½ the total length of head 51. Second side panel 69-1 is generally flat and extends at an acute angle away from first side panel 67-1 and terminates at the junction of inner wall 57 and sidewall 59-1.

Similarly, second outwardly protruding wing 65-2 is shaped to include a first side panel 67-2 and a second side panel 69-2. First side panel 67-2 is generally flat and extends from end wall 61 at an acute angle away from sidewall 59-2, first side panel 67-2 having a length which is approximately ½ the total length of head 51. Second side panel 69-2 is generally flat and extends at an acute angle away from first side panel 67-2 and terminates at the junction of inner wall 57 and sidewall 59-2.

Cable Tie Installation Tool

Figure 9:
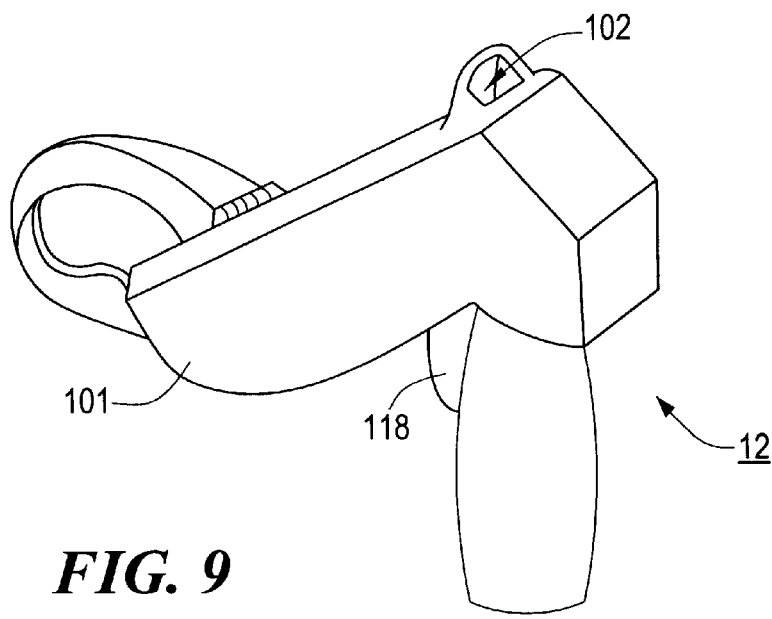
FIG. 9 is a front perspective view of a cable tie installation tool constructed according to the teachings of the present invention.

Referring now to the drawings, there is shown in FIG. 9 novel cable tie installation tool 12. As noted above, cable tie installation tool 12 is designed to be used in conjunction with cable tie 11. Specifically, cable tie installation tool 12 performs a fully automatic installation of an individually loaded cable tie 11 around a desired bundle of objects. However, it is to be understood that cable tie installation tool 12 is not limited to using cable tie 11. Rather, cable tie installation tool 12 could use alternative types of conventional cable ties without departing from the spirit of the present invention.

As will be described further in detail below, cable tie installation tool 12 comprises a housing 101 for protecting internal components of tool 12, a transport assembly 103 for advancing an individually loaded cable tie 11 through tool 12, a jaw assembly 105 for guiding tail 15 through head 13 to form cable tie 11 into a closed loop around a desired bundle, a cinch assembly 107 for advancing tail 15 further through head 13 so as to reduce the size of the closed loop of tie 11 around the desired bundle, a tension monitoring device 109 for establishing a maximum tension level for the closed loop of cable tie 11 around the desired bundle and a cut assembly 111 for severing the excess portion of tail 15 once cable tie 11 reaches its maximum tension level.

Housing

Cable tie installation tool 12 comprises a housing 101 constructed of a hard and durable material, such as plastic. As can be appreciated, housing 101 serves to protect internal components of tool 12 disposed therewithin. Preferably, housing 101 is ergonomically designed to facilitate holding tool 12 in the hand of the operator.

Transport Assembly

Figure 10:
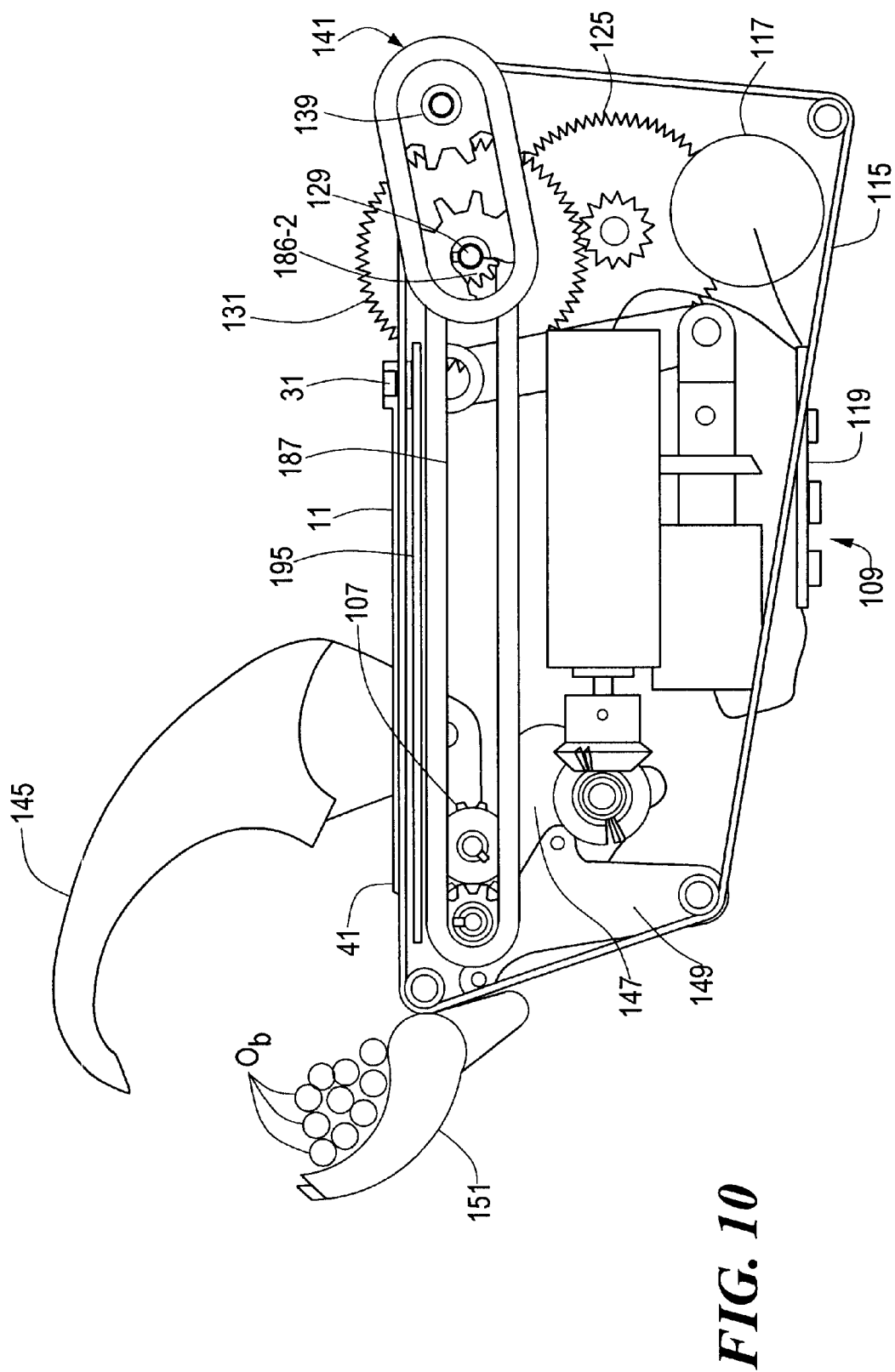
FIG. 10 is a front plan view, broken away in part, of various components of the cable tie installation tool shown in FIG. 9, the tool being shown with a plurality of objects to be bundled disposed on the lower jaw and with the cable tie of FIG. 1 mounted on the transport belt.
Figure 11:
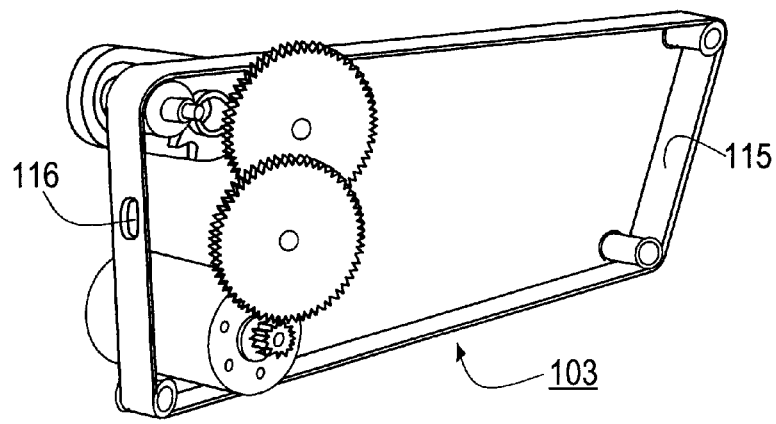
FIG. 11 is a rear perspective view of the transport assembly shown in FIG. 10.
Figure 12:
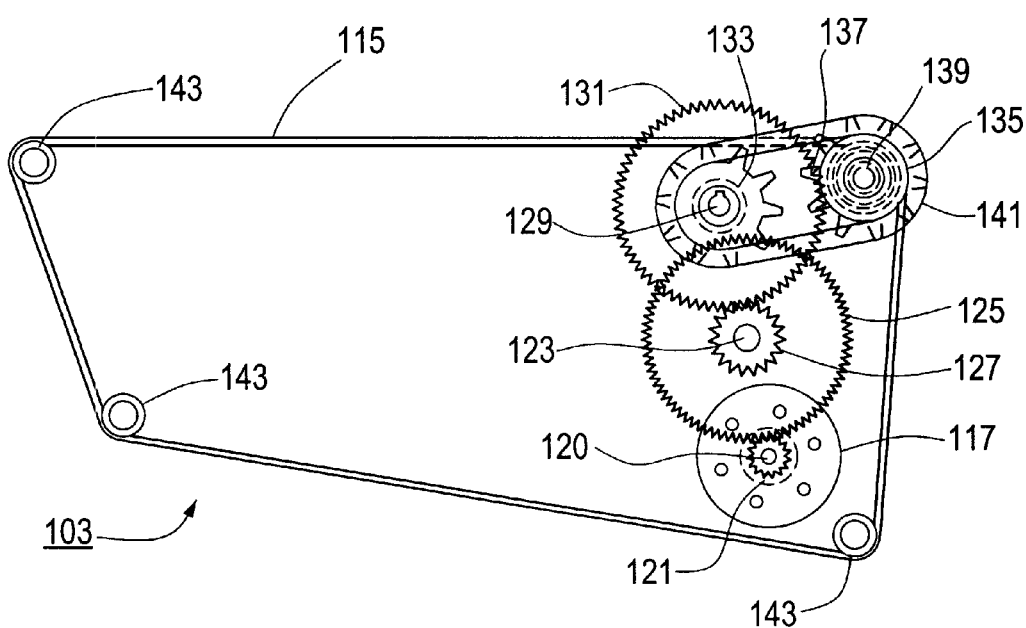
FIG. 12 is a front plan view of the transport assembly shown in FIG. 10, certain hidden components of the transport assembly being shown in solid line form rather than dashed line form for viewing purposes.

Referring now to FIGS. 11–12, transport assembly 103 is disposed within housing 101 and comprises a Kevlar/Urethane timing belt 115 which is shaped to define at least one opening 116 therein. Opening 116 is sized and shaped to fittingly receive head 13 of cable tie 11. Specifically, each cable tie 11 is individually, manually loaded into cable tie installation tool 12 with head 13 disposed snugly within opening 116. Loaded in this manner, bottom surface 36 of wings 31 are supported on belt 115 to prevent head 13 from falling entirely through opening 116. Furthermore, with head 13 properly positioned within opening 116, tail 15 lies flat along belt 115 so that free end 41 points forward towards jaw assembly 105, as shown in FIG. 10.

Transport belt 115 is rotatably driven by a variable speed motor 117 which is electrically connected to a mechanically squeezable trigger 118 through a control circuit 119. Motor 117 comprises a rotatable axle 120 and a gear 121 fixedly mounted onto axle 120. A rotatable axle 123 comprising an outer gear 125 fixedly mounted on axle 123 and an inner gear 127 fixedly mounted on axle 123 is disposed such that gear 125 engages gear 121. Similarly, a rotatable axle 129 comprising an outer gear 131 fixedly mounted on axle 129 and a sprocket 133 fixedly mounted on axle 129 is disposed such that gear 131 engages gear 127. A rotatable pulley 135 having a sprocket 137 fixedly mounted on pulley 135 and a clutch 139 mounted on pulley 135 is spaced apart from axle 129. A feed chain 141 is mounted on sprockets 133 and 137 so as to rotatably couple sprockets 133 and 137 together. A plurality of passive pulleys 143 are spaced apart from pulley 135 and transport belt 115 is tightly positioned around pulleys 143 and 135.

Accordingly, referring now to FIG. 12, depression of trigger 118 causes control circuit 119 to activate transport assembly 103. Activation of transport assembly 103 causes axle 120 and gear 121 of motor 117 to rotate in a counterclockwise direction which, in turn, causes gear 125 to rotate in a clockwise direction. Clockwise rotation of gear 125 similarly causes inner gear 127 to rotate in a clockwise direction which, in turn, drives outer gear 131 in a counterclockwise direction. Counterclockwise rotation of outer gear 131 similarly causes sprocket 133 to rotate in a counterclockwise direction which, in turn, drives feed chain 141 in a counterclockwise direction. Counterclockwise rotation of feed chain 141 drives sprocket 137 in a counterclockwise direction which, in turn, rotates pulley 135 in a counterclockwise direction. The counterclockwise rotation of pulley 135 drives transport belt 115 in a counterclockwise direction with passive pulleys 143 rotating in a counterclockwise direction with belt 115.

With cable tie 11 disposed within opening 116, counterclockwise rotation of transport belt 115 advances cable tie 11 into jaw assembly 105. Cable tie 11 is advanced forward towards jaw assembly 105 until third side panels 35 of wings 31 abut against housing 101. Preferably, housing 101 is shaped to include on its inner surface a pair of hard alignment stops (not shown) onto which third side panels 35 abut. In this manner, the abutment of panels 35 of cable tie 11 against the hard alignment stops serves to properly position head 13 within jaw assembly 105 before tail 15 is fed through head 13, which is highly desirable.

It should be noted that, as head 13 of cable tie 11 approaches the pair of hard alignment stops formed in housing 101, control circuit 119 slows down motor 117 to prevent hard contact between cable tie 11 and the pair of hard alignment stops, thereby reducing any chance of damage and/or malfunction. Specifically, as head 13 of cable tie 11 approaches the pair of hard alignment stops formed in housing 101, control circuit 119 slows down and incrementally advances transport belt 115 until head 13 abuts against the pair of hard alignment stops. Once head 13 abuts against the hard alignment stops formed in housing 101, jaw assembly 105 can drive tail 15 through head 13 and cinch assembly 107 can further close the loop formed by cable tie 11 around its desired bundle, as will be described further in detail below.

As noted above, control circuit 119 drives motor 117 in the counterclockwise direction in order for transport assembly 103 to advance cable tie 11 into jaw assembly 105. In addition, as will be described further in detail below, control circuit 119 also drives motor 117 in the clockwise direction in order for cinch assembly 107 to tension cable tie 11 around its desired bundle. Accordingly, clutch 139 serves to prevent transport belt 115 from advancing in the clockwise direction when motor 117 is driven clockwise to activate cinch assembly 107.

Jaw Assembly

Referring now to FIGS. 13–18, jaw assembly 105 comprises an upper jaw 145, a cam 147, a linkage 149, a lower jaw 151 and a jaw assembly motor 153 which is electrically connected to control circuit 119 and which is activated by depressing trigger 118. Preferably, jaw assembly motor 153 and motor 117 are both powered by a common power source (not shown), such as a power cord or a battery pack which is either disposed within housing 101 or carried by the operator.

Upper jaw 145 comprises a first end 155, a second end 157 and a roller 159 rotatably mounted at second end 157. As will be described further in detail below, upper jaw 145 is capable of rotation about a pivot point 161.

Cam 147 is an integrally formed piece which is rotatably driven in the counterclockwise direction by motor 153 during operation. Cam 147 comprises a generally cylindrical shaft 163 which is adapted to rotate about a cam pivot point 165. Cam 147 further comprises first and second cam lobes 167 and 169 which project out from shaft 163. Preferably, lobes 167 and 169 are integrally formed onto shaft 163 to make cam 147 one piece. However, it is to be understood that cam 147 could alternatively be constructed from multiple separate pieces without departing from the spirit of the present invention.

Linkage 149 is generally T-shaped and comprises first and second rollers 171 and 173 rotatably mounted thereon. As will be described further in detail below, linkage 149 is capable of rotation about a pivot point 175.

Lower jaw 151 comprises a first end 177 and a second end 179. As will be described further in detail below, lower jaw 151 is capable of rotation about a pivot point 181.

Roller 159 on upper jaw 145 is disposed to continuously contact either the outer periphery of first cam lobe 167 or the outer periphery of shaft 163. Similarly, roller 171 on linkage 149 is disposed to continuously contact either the outer periphery of second cam lobe 169 or the outer periphery of shaft 163. Furthermore, roller 173 on linkage 149 is disposed to continuously contact second end 179 of lower jaw 151.

Figure 13:
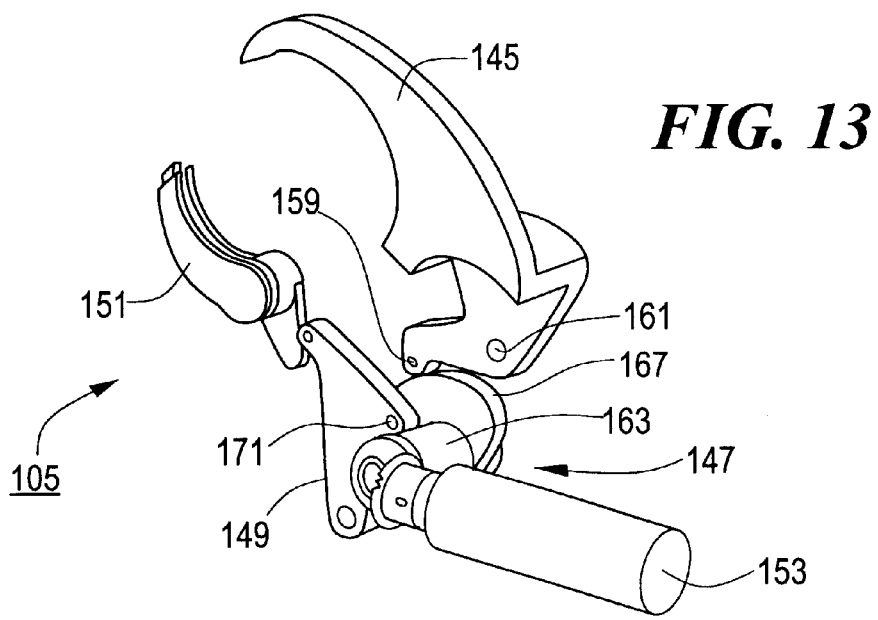
FIG. 13 is a front perspective view of the jaw assembly shown in FIG. 10, the jaw assembly being shown in its open configuration.
Figure 14:
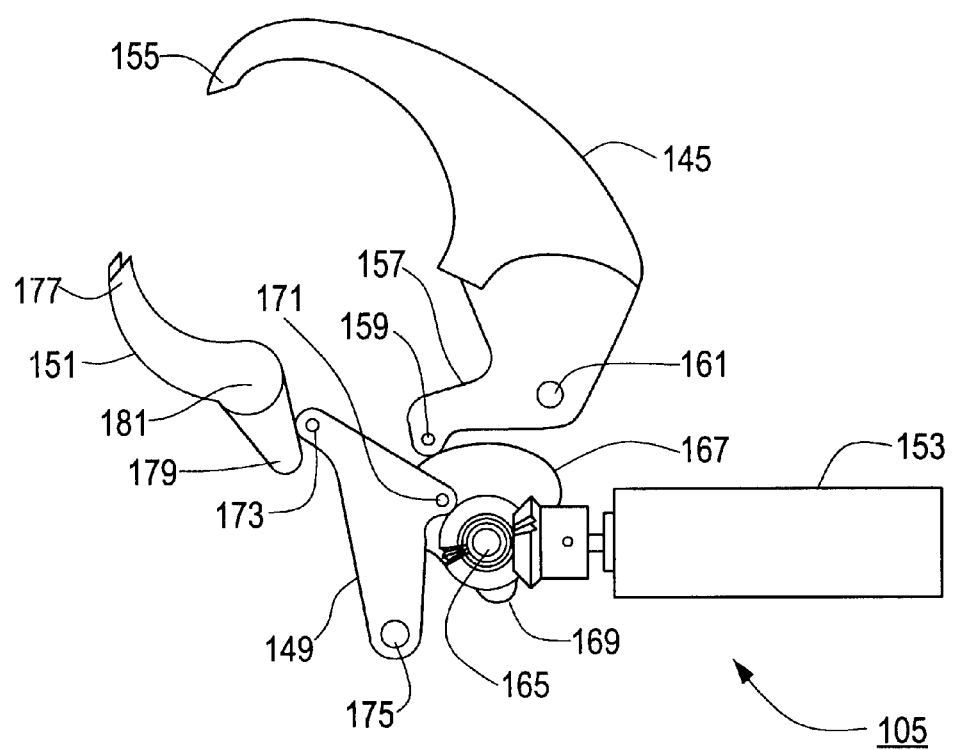
FIG. 14 is a front plan view of the jaw assembly shown in FIG. 10, the jaw assembly being shown in its open configuration.
Figure 15:
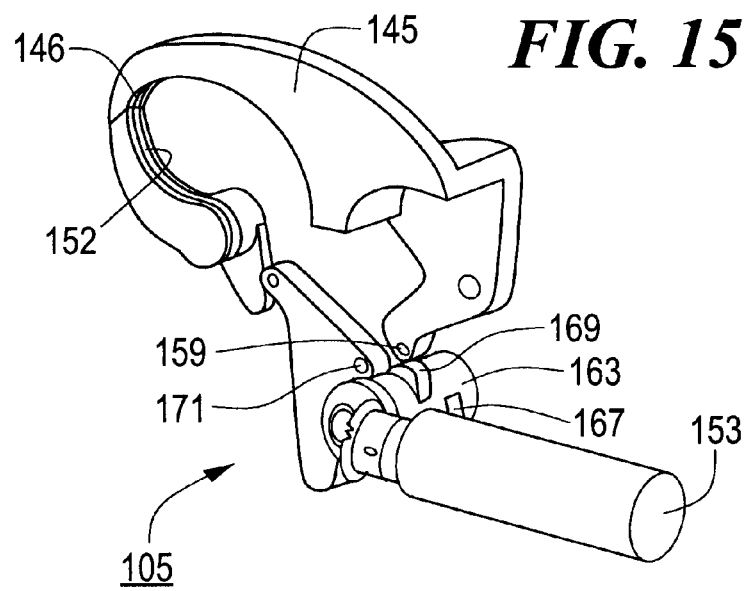
FIG. 15 is a front perspective view of the jaw assembly shown in FIG. 10, the jaw assembly being shown in its closed configuration.
Figure 16:
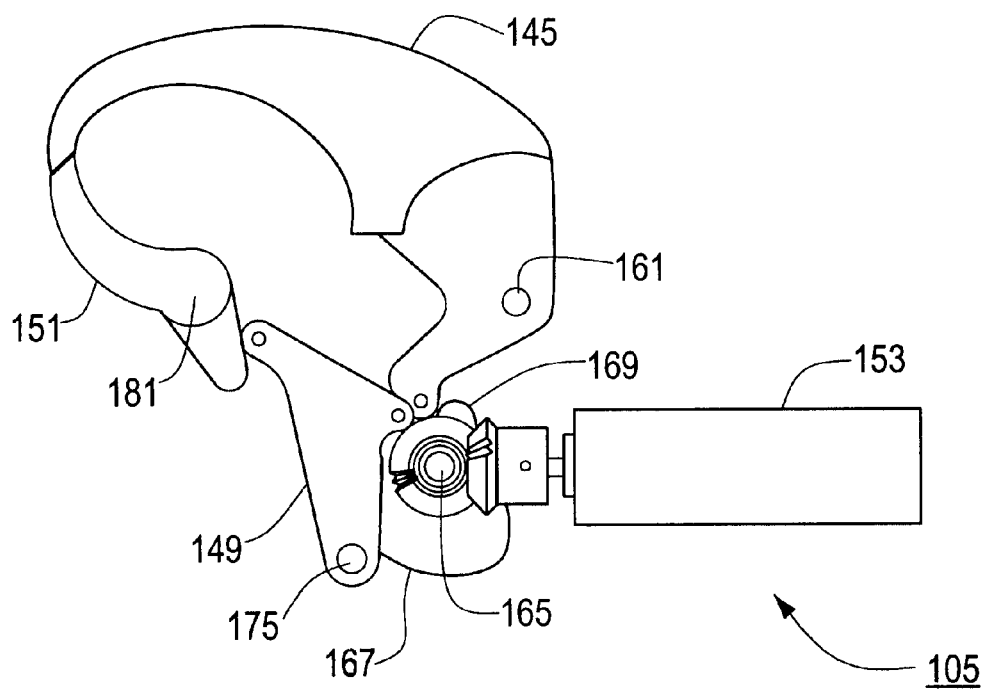
FIG. 16 is a front plan view of the jaw assembly shown in FIG. 10, the jaw assembly being shown in its closed configuration.

Accordingly, with jaw assembly 105 disposed in its open position, as shown in FIGS. 13 and 14, the depression of trigger 118 activates motor 153 which, in turn, continuously drives cam 147 in a counterclockwise direction. As cam 147 rotates in a counterclockwise direction about cam pivot point 165, eventually roller 159 on upper jaw 145 slides downward from contacting first cam lobe 167 and contacts shaft 163. The downward movement of roller 159 pivots upper jaw 145 in a counterclockwise direction about pivot point 161 until jaw assembly 105 is disposed into its closed position, as shown in FIGS. 15 and 16.

Figure 17:
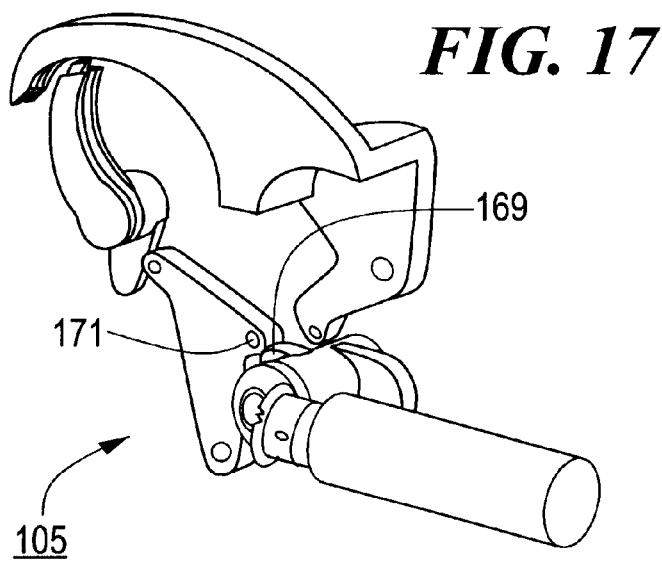
FIG. 17 is a front perspective view of the jaw assembly shown in FIG. 10, the jaw assembly being shown in its overclosed configuration.
Figure 18:
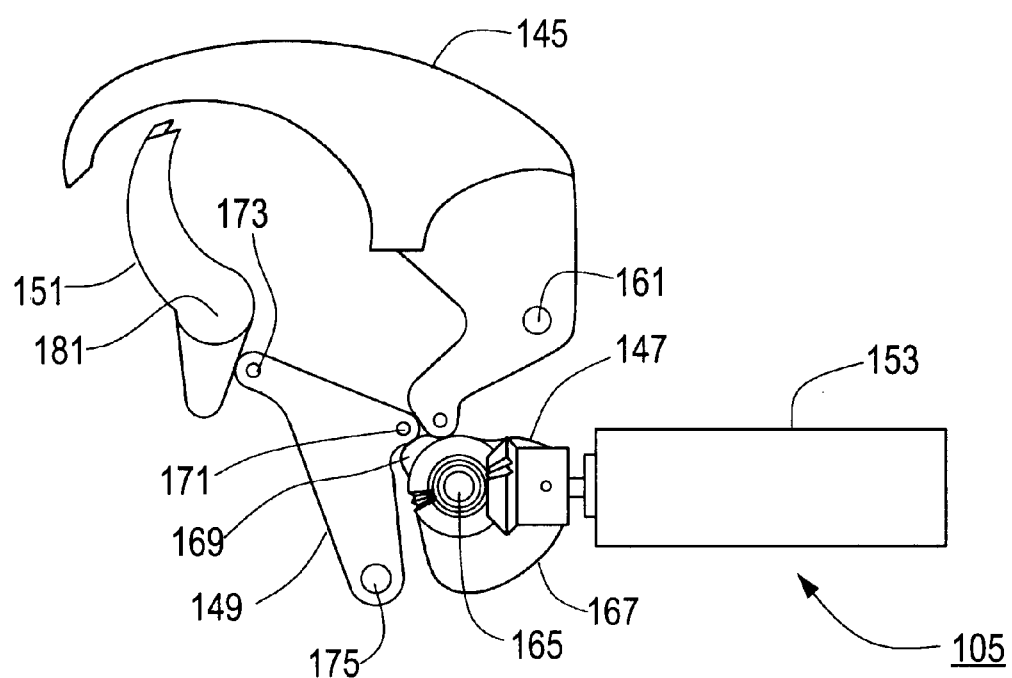
FIG. 18 is a front plan view of the jaw assembly shown in FIG. 10, the jaw assembly being shown in its overclosed configuration.

Continued counterclockwise rotation of cam 147 about cam pivot point 165 eventually causes second cam lobe 169 to urge roller 171 in the direction away from cam pivot point 165. Specifically, continued rotation of cam 147 causes roller 171 to move from contacting shaft 163 and slide outward so as to contact second cam lobe 169. The lateral movement of roller 171 away from cam pivot point 165 causes linkage 149 to rotate in a counterclockwise direction about linkage pivot point 175 which, in turn, causes roller 173 to rotate lower jaw 151 in a clockwise direction about lower jaw pivot point 181 until jaw assembly 105 is disposed into its overclosed position, as shown in FIGS. 17 and 18.

As cam 147 further rotates in the counterclockwise direction about cam pivot point 165, eventually roller 159 slides upward from contacting shaft 163 and contacts first cam lobe 167. Simultaneously, roller 171 slides inward towards cam pivot point 165 as roller 171 slides in from contacting second cam lobe 169 and contacts shaft 163. As a result, jaw assembly 105 returns to its original open position, as shown in FIGS. 13 and 14, in anticipation of the cinching, tensioning and cutting processes, which will be described in detail below.

It should be noted that the particular size, shape and positioning of cam lobes 167 and 169 effects the relative orientation and timing sequence of the open, close and overdose configurations of upper jaw 145 and lower jaw 151. As such, the particular size, shape and positioning of cam lobes 167 and 169 disposes jaw assembly 105 in its overdose position for a relatively short duration and then subsequently disposes jaw assembly 105 into its open position. Resultingly, jaw assembly 105 is disposed in its open configuration during the cinching process, thereby keeping jaws 145 and 151 from hindering proper cinching, which is highly desirable.

Cinch Assembly

Figure 19:
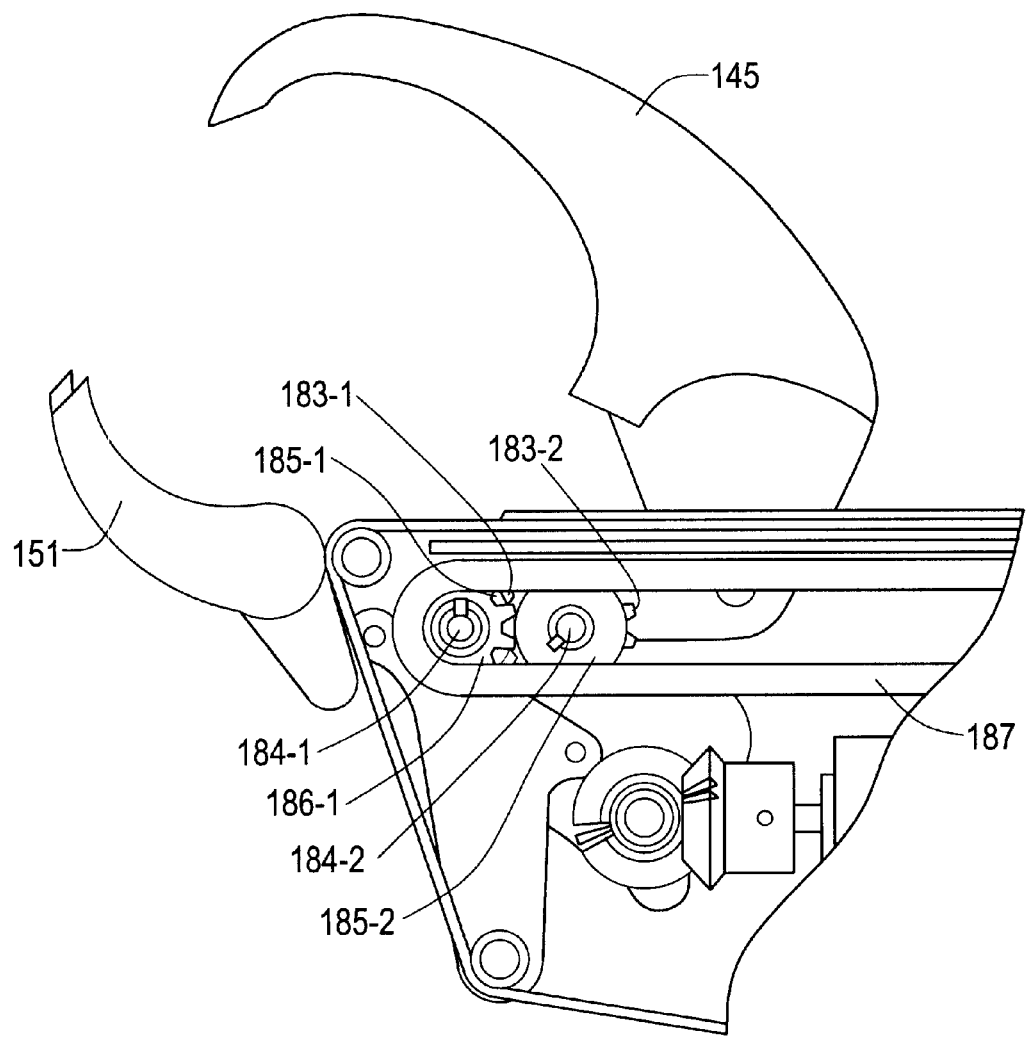
FIG. 19 is an enlarged, fragmentary front plan view of the various components of the cable tie installation tool shown in FIG. 10.

Referring now to FIGS. 10 and 19, cinch assembly 107 is disposed within housing 101 and comprises a first cinch knurl 183-1 fixedly mounted on a rotatable axle 184-1 and a second cinch knurl 183-2 fixedly mounted on a rotatable axle 184-2. Furthermore, cinch assembly 107 comprises a first gear 185-1 fixedly mounted on rotatable axle 184-1 and a second gear 185-2 fixedly mounted on rotatable axle 184-2, first gear 185-1 and second gear 185-2 being disposed to continuously engage one another. First and second cinch knurls 183 are spaced slightly apart and include an outer periphery which is adapted to engage and pull tail 15 down therebetween. As such, cinch knurls 183 serve to advance tail 15 through head 13 so as to reduce the size of the closed loop of cable tie 11 formed around the desired bundle.

A cinch chain 187 is mounted on a chain gear 186-1 which is fixedly mounted on rotatable axle 184-1 and a chain gear 186-2 which is fixedly mounted on axle 129. Accordingly, after the overclose configuration of jaw assembly 105 advances tail 15 down through head 13 and between cinch knurls 183, control circuit 119 activates cinch assembly 107. Activation of cinch assembly 107 causes motor 117 to rotate in clockwise direction which, in turn, causes gear 125 to rotate in a counterclockwise direction. Counterclockwise rotation of gear 125 similarly causes inner gear 127 to rotate in a counterclockwise direction which, in turn, drives outer gear 131 in a clockwise direction. Clockwise rotation of outer gear 131 similarly causes gear 186-2 to rotate in a clockwise direction which, in turn, drives cinch chain 187 in a clockwise direction. Rotation of cinch chain 187 in a clockwise direction drives gear 186-1 in a clockwise direction which, in turn, rotates gear 185-1 in a counterclockwise direction. Rotation of gear 185-1 in a counterclockwise direction drives gear 185-2 in a counterclockwise direction. As a result, the rotation of gear 185-1 in a clockwise direction drives cinch knurl 183-1 in a clockwise direction and the rotation of gear 185-2 in a counterclockwise direction drives cinch knurl 183-2 in a counterclockwise direction, thereby rotating cinch knurls 183 inwards towards each other so as to pull tail 15 down through head 13 to close the loop formed by cable tie 11 around the desired bundle.

As noted above, in order to drive cinch assembly 107, motor 117 rotates in the opposite direction than when motor 117 drives transport assembly 103. Accordingly clutch 139 serves to prevent clockwise rotation of transport belt 115 when motor 117 rotates to drive cinch assembly 107.

Tension Monitoring Device

As cinch assembly 107 advances tail 15 through head 13 to reduce the size of the closed loop formed by cable tie 11 around the desired bundle, tension monitoring device 109 regulates the maximum tension level of the closed loop of cable tie 11 around the desired bundle. For simplicity, tension monitoring device 109 is shown herein as being located within control circuit 119 which, in turn, is disposed within housing 101. It should be noted that tension monitoring device 109 could be constructed to include a knob (not shown) or other similar device which protrudes out of housing 101 and allows for adjusting the maximum tension level of the closed loop of tie 11 around the desired bundle.

Accordingly, as cinch assembly 107 advances tail 15 through head 13, the load placed on motor 117 to continue the cinching process increases. Tension monitoring device 109 is electronically coupled to motor 117 and monitors the load placed on motor 117. As can be appreciated, once the load placed on motor 117 reaches a maximum level, tension monitoring device 109 terminates the activation of cinch assembly 107, thereby establishing a maximum tension level of the closed loop of cable tie 11 around the desired bundle.

Cut Assembly

Figure 20:
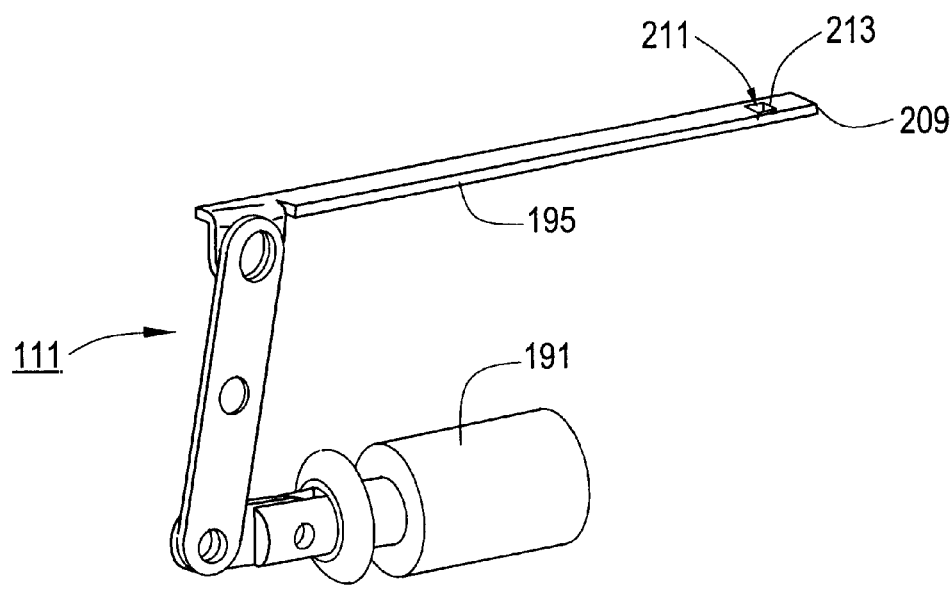
FIG. 20 is a rear perspective view of the cut assembly shown in FIG. 10.
Figure 21:
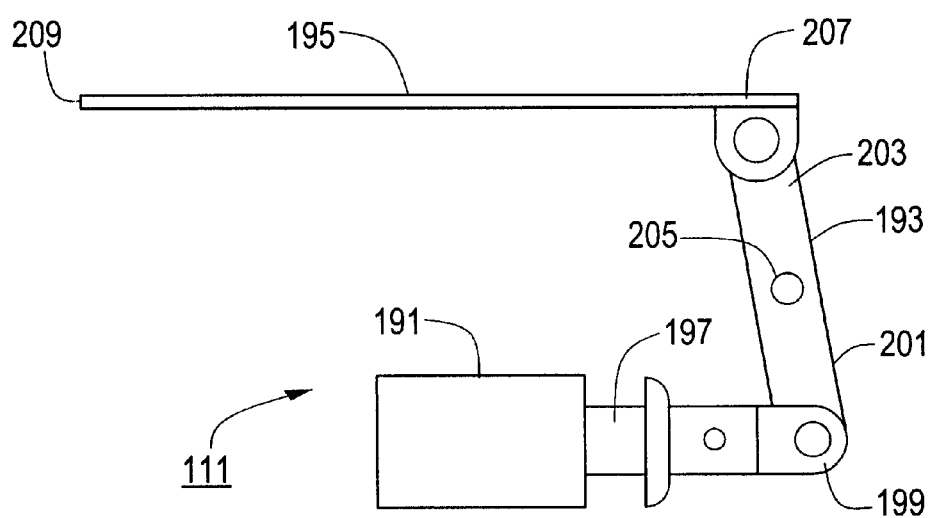
FIG. 21 is a front plan view of the cut assembly shown in FIG. 10.

Referring now to FIGS. 20–21, cut assembly 111 is disposed within housing 101 and comprises a solenoid 191 which is electrically connected to control circuit 119, a cut linkage 193 and a knife blade 195. Solenoid 191 is preferably a conventional solenoid which includes a slidably mounted plunger 197 having a free end 199. Plunger 197 of solenoid 191 is naturally disposed in an extended position, as shown in FIG. 21 and, upon activation of solenoid 191, plunger 197 slides inward. Linkage 193 comprises a first end 201 coupled to free end 199 of plunger 197 and a second end 203 and is disposed to rotate about link pivot point 205. Knife blade 195 comprises a first end 207 which is coupled to second end 203 of linkage 193, a second end 209 and an opening 211 formed therein proximate second end 209. Opening 211 is partially defined by a sharpened knife edge 213 proximate second end 209. As will be described further in detail below, the overdose configuration of jaw assembly 105 disposes tail 15 through head 13, through opening 211 and down between cinch knurls 183.

Accordingly, with tail 15 advanced through head 13 and through opening 211, once tension monitoring device 109 detects that the preset maximum tension level of cable tie 11 around the bundle has been met, control circuit 119 activates solenoid 191. Referring now to FIG. 21, the activation of solenoid 191 pulls plunger 197 inward which, in turn, causes linkage 193 to rotate in a counterclockwise direction about link pivot point 205. The counterclockwise rotation of linkage 193 pulls knife blade 195 rearward so as to draw sharpened knife edge 213 in contact tail 15, thereby severing the strap excess.

Operation of Cable Tie 11 Using Cable Tie Installation Tool 12

In use, cable tie 11 functions in conjunction with cable tie installation tool 12 to bundle a plurality of objects $O_b$ in the following manner. With jaw assembly 105 disposed in its open configuration, the plurality of objects $O_b$ to be bundled are disposed between upper jaw 145 and lower jaw 151, as shown in FIG. 10. An individual cable tie 11 is then manually fed through an opening 102 formed in the rear of housing 101 so that head 13 is disposed snugly within opening 116 formed in belt 115 and so that free end 41 lies on top of belt 115 and projects forward towards jaw assembly 105. With cable tie 11 properly loaded in belt 115, bottom surface 36 of wings 31 is supported on belt 115 to prevent head 13 from falling entirely through opening 116.

Having manually loaded an individual cable tie 11 into tool 12, trigger 118 is depressed which, in turn, causes control circuit 119 to activate transport assembly 103 and jaw assembly 105. Specifically, control circuit 119 causes motor 117 to rotate in the counterclockwise direction which, in turn, causes belt 115 to rotate in the counterclockwise direction. As such, the activation of transport assembly 103 advances cable tie 11 forward towards jaw assembly 105. Simultaneously, jaw motor 153 drives jaw assembly 105 into its closed position. The closed configuration of jaw assembly 105 enables tail 15 to travel around the desired bundle through a track 152 formed in lower jaw 151 and a track 146 formed in upper jaw 145. As transport assembly 103 advances cable tie 11 through jaw assembly 105, control circuit 119 cross modulates motor 117 as third side panels 35 of wings 31 approach the hard alignment stops formed in housing 101. Once transport assembly 103 advances cable tie 11 such that wings 31 abut against the hard alignment stops, control circuit 119 shuts off transport assembly 103. As such, tail 15 is looped around the desired bundle and free end 41 is aligned to project into strap accepting channel 20.

With tail 15 looped around the desired bundle, jaw motor 153, which is in continuous rotation during the depression of trigger 118, drives jaw assembly 105 into a transitory overclosed configuration. The transitory overclosed configuration of jaw assembly 105 feeds free end 41 of tail 15 through strap accepting channel 20 so as to form cable tie 11 into a closed loop. The overclosed position of jaw assembly 105 also serves to feed tail 15 through strap accepting channel 20 until free end 41 projects through opening 211 in knife blade 195 and down between cinch knurls 183.

With free end 41 disposed between cinch knurls 183, jaw motor 153 drives jaw assembly 105 into its open configuration and, at the same time, control circuit 119 activates cinch assembly 107. Specifically, control circuit 119 causes motor 117 to rotate in a clockwise direction which, in turn, causes cinch knurls 183 to pull tail 15 down through head 13. Cinch assembly 107 continues to advance tail 15 through head 13, thereby closing the size of the loop formed by cable tie 11 around the desired bundle, until tension monitoring device 109 determines that the maximum tension level of cable tie 11 around the bundle has been reached. Once tension monitoring device 109 has detected the maximum tension level of cable tie 11 around the desired bundle, control circuit 119 terminates the activation of cinch assembly 107.

Having terminated the activation of cinch assembly 107, control circuit 119 activates cut assembly 111. Specifically, control circuit 119 activates solenoid 191 which, in turn, causes sharpened knife edge 213 to sever the excess portion of tail 15 which has been disposed through head 13. At this point, trigger 118 is released and the wrapped bundle is removed from upper jaw 145 and lower jaw 151. This process for bundling plurality of objects $O_b$ using cable tie 11 in conjunction with cable tie installation tool 12 can be repeated as necessary.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A cable tie installation tool for fastening a cable tie around a plurality of objects, said cable tie comprising a head and a tail integrally formed onto said head, said head being adapted to cooperate with said tail to form a closed loop around the plurality of objects, said cable tie installation tool comprising,
    a) a jaw assembly adapted to guide the tail around the plurality of objects and through its associated head to form the cable tie into a closed loop around the plurality of objects, and
    b) a transport assembly for advancing the cable tie into said jaw assembly, said transport assembly comprising a belt which is adapted to contact and advance said cable tie into said jaw assembly.

2. The cable tie installation tool as claimed in claim 1 wherein said belt is rotatably driven in a first direction by a first motor.

3. The cable tie installation tool as claimed in claim 1 wherein said belt is shaped to include an opening therein.

4. A cable tie installation tool for fastening a cable tie around a plurality of objects, said cable tie comprising a head and a tail integrally formed onto said head, said head being adapted to cooperate with said tail to form a closed loop around the plurality of objects, said cable tie installation tool comprising,
    a) a jaw assembly adapted to guide the tail around the plurality of objects and through its associated head to form the cable tie into a closed loop around the plurality of objects, and
    b) a transport assembly for advancing the cable tie into said jaw assembly, said transport assembly comprising a belt, said belt being rotatably driven in a first direction by a first motor, said belt being shaped to include an opening which is adapted to enable the head of the cable tie to be fittingly disposed therewithin.

5. The cable tie installation tool as claimed in claim 4 further comprising a housing which is adapted to receive an individual cable tie that is loaded directly into said transport assembly.

6. The cable tie installation tool as claimed in claim 5 wherein the first motor is coupled to a mechanically squeezable trigger through a control circuit.

7. The cable tie installation tool as claimed in claim 6 wherein said belt is mounted on a plurality of rotatable pulleys.

8. The cable tie installation tool as claimed in claim 7 wherein said transport assembly further comprises a clutch for preventing said belt from being rotatably driven by said motor in the direction opposite the first direction.

9. The cable tie installation tool as claimed in claim 8 wherein said jaw assembly comprises a pair of jaws which is driven by a second motor between open, closed and overclosed positions.

10. The cable tie installation tool as claimed in claim 9 wherein said jaw assembly further includes a cam comprising a rotatable shaft and a pair of cam lobes which are integrally formed onto said rotatable shaft.

11. A cable tie installation tool for fastening a cable tie around a plurality of objects, said cable tie comprising a head and a tail integrally formed onto said head, said head being adapted to cooperate with said tail to form a closed loop around the plurality of objects, said cable tie comprising a pair of outwardly projecting wings which are formed onto said head, each of said outwardly projecting wings comprising a generally flat bottom surface and a side panel, said cable tie installation tool comprising,
    a) a jaw assembly adapted to guide the tail around the plurality of objects and through its associated head to form the cable tie into a closed loop around the plurality of objects, and b) a transport assembly for advancing the cable tie into said jaw assembly, said transport assembly comprising a belt which is adapted to contact and advance said cable tie into said jaw assembly.

12. The cable tie installation tool as claimed in claim 11 wherein said belt is rotatably driven in a first direction by a first motor.

13. The cable tie installation tool as claimed in claim 11 wherein said belt is shaped to include an opening therein.

14. A cable tie installation tool for fastening a cable tie around a plurality of objects, said cable tie comprising a head and a tail integrally formed onto said head, said head being adapted to cooperate with said tail to form a closed loop around the plurality of objects, said cable tie comprising a pair of outwardly projecting wings which are formed onto said head, each of said outwardly projecting wings comprising a generally flat bottom surface and a side panel, said cable tie installation tool comprising,
a) a jaw assembly adapted to guide the tail around the plurality of objects and through its associated head to form the cable tie into a closed loop around the plurality of objects, and
b) a transport assembly for advancing the cable tie into said jaw assembly, said transport assembly comprising a belt, said belt being rotatably driven in a first direction by a first motor, said belt being shaped to include an opening which is adapted to enable the head of the cable tie to be fittingly disposed therewithin.

15. The cable tie installation tool as claimed in claim 14 further comprising a housing which is adapted to receive an individual cable tie that is loaded directly into said transport assembly.

16. The cable tie installation tool as claimed in claim 15 wherein the first motor is coupled to a mechanically squeezable trigger through a control circuit.

17. The cable tie installation tool as claimed in claim 16 wherein said belt is mounted on a plurality of rotatable pulleys.

18. The cable tie installation tool as claimed in claim 17 wherein said transport assembly further comprises a clutch for preventing said belt from being rotatably driven by said motor in the direction opposite the first direction.

19. The cable tie installation tool as claimed in claim 18 wherein said jaw assembly comprises a pair of jaws which is driven by a second motor between open, closed and overclosed positions.

20. The cable tie installation tool as claimed in claim 19 wherein said jaw assembly further includes a cam comprising a rotatable shaft and a pair of cam lobes which are integrally formed onto said rotatable shaft.

21. A cable tie installation tool for fastening a cable tie around a plurality of objects, said cable tie comprising a head and a tail integrally formed onto said head, said head being adapted to cooperate with said tail to form a closed loop around the plurality of objects, said cable tie installation tool comprising,
a) a jaw assembly adapted to guide the tail around the plurality of objects and through its associated head to form the cable tie into a closed loop around the plurality of objects,
b) a transport assembly for advancing the cable tie into said jaw assembly,
c) a cinch assembly for advancing the tail through the head so as to reduce the size of the closed loop around the plurality of objects,
d) a tension monitoring device for monitoring the tension level of the closed loop around the bundle and establishing a maximum tension level, said tension monitoring device precluding said cinch assembly from advancing the tail through the head upon detecting the maximum tension level, said tension monitoring device being in the form of a control circuit, and
e) a cut assembly for severing the excess portion of the tail fed through the head once said tension monitoring device detects the maximum tension level, said cut assembly comprising a solenoid which is electrically coupled to the control circuit.

22. The cable tie installation tool as claimed in claim 21 wherein said cut assembly further comprises a slidably mounted knife blade which is coupled to said solenoid.

23. The cable tie installation tool as claimed in claim 22 wherein the knife blade is coupled to said solenoid through a pivotally mounted linkage.

24. The cable tie installation tool as claimed in claim 23 wherein the knife blade includes an opening formed therein which is adapted to receive the tail of the cable tie.

25. The cable tie installation tool as claimed in claim 24 wherein the opening formed in the knife blade is partially defined by a sharpened knife edge.

26. A cable tie installation tool for fastening a cable tie around a plurality of objects, said cable tie comprising a head and a tail integrally formed onto said head, said head being adapted to cooperate with said tail to form a closed loop around the plurality of objects, said cable tie installation tool comprising,
a) a jaw assembly adapted to guide the tail around the plurality of objects and through its associated head to form the cable tie into a closed loop around the plurality of objects,
b) a transport assembly for advancing the cable tie into said jaw assembly,
c) a cinch assembly for advancing the tail through the head so as to reduce the size of the closed loop around the plurality of objects,
d) a first motor for driving said transport assembly and said cinch assembly, and
e) a second motor for driving said jaw assembly.

27. A cable tie installation tool for fastening a cable tie around a plurality of objects, said cable tie comprising a head and a tail integrally formed onto said head, said head being adapted to cooperate with said tail to form a closed loop around the plurality of objects, said cable tie installation tool comprising,
a) a jaw assembly adapted to guide the tail around the plurality of objects and through its associated head to form the cable tie into a closed loop around the plurality of objects,
b) a transport assembly for advancing the cable tie into said jaw assembly,
c) a cinch assembly for advancing the tail through the head so as to reduce the size of the closed loop around the plurality of objects, and
d) a first motor rotatable in a first direction for driving said transport assembly and rotatable in a second direction for driving said cinch assembly.

* * * * *